(12) United States Patent　　　　(10) Patent No.: US 8,700,062 B1
Olson et al.　　　　　　　　　　　　　(45) Date of Patent: Apr. 15, 2014

(54) ENHANCING GEO-LOCATION PRECISION IN WIRELESS SYSTEMS

(71) Applicant: Verizon Patent and Licensing Inc., Basking Ridge, NJ (US)

(72) Inventors: Brian Olson, Clayton, CA (US); Scott A Townley, Gilbert, AZ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/670,872

(22) Filed: Nov. 7, 2012

(51) Int. Cl.
　　*H04W 24/00*　　　(2009.01)
(52) U.S. Cl.
　　USPC .................................. 455/456.1; 455/456.5

(58) Field of Classification Search
　　USPC ...................................................... 455/456.1
　　See application file for complete search history.

(56) References Cited

U.S. PATENT DOCUMENTS

| | | | |
|---|---|---|---|
| 7,558,852 B2 * | 7/2009 | Douglas et al. | 709/224 |
| 7,567,822 B2 * | 7/2009 | Hart et al. | 455/562.1 |
| 2006/0075131 A1 * | 4/2006 | Douglas et al. | 709/230 |
| 2008/0032727 A1 * | 2/2008 | Stephenson et al. | 455/513 |

* cited by examiner

*Primary Examiner* — Charles Shedrick

(57) ABSTRACT

A system may be configured to compute an estimated location of a user device based on an estimation coefficient and a measured distance between the user device and a base station. The estimation coefficient may be based on: an actual distance between a reference device and the base station, and a measured distance between the reference device and the base station. The system may store or output the information regarding the estimated location of the device.

20 Claims, 15 Drawing Sheets

| Device ID | Location |
|---|---|
| 00001 | 41.006435 N, -93.867187 W |
| 00002 | 40.506282 N, -93.768311 W |
| ⋮ | ⋮ |
| 00099 | 40.417283 N, -93.668222 W |

| Sector ID | RAT | Band frequency | Carrier frequency | Location | Antenna azimuth | Antenna beamwidth |
|---|---|---|---|---|---|---|
| 0001 | LTE | 746-787 MHz | 700 MHz | 39.006435 N, -92.867187 W | 27.02° | 35.01° |
| 0002 | 3G | 1850-1990 MHz | 1900 MHz | 38.506282 N, -94.768311 W | 19.57° | 22.22° |
| ⋮ | ⋮ | ⋮ | ⋮ | ⋮ | ⋮ | ⋮ |
| 0099 | LTE | 746-787 MHz | 700 MHz | 37.417283 N, -95.668222 W | 182.33° | 33.34° |

600 →

| Sector ID | δ |
|---|---|
| 0001 | 0.98 |
| 0002 | 0.92 |
| ••• | ••• |
| 0099 | 0.98 |

| Sector ID | Time period | δ |
|---|---|---|
| 0001 | Monday-Wednesday | 0.98 |
| 0001 | Thursday-Friday | 1.1 |
| 0001 | Saturday-Sunday | 0.96 |

| Sector ID | $d_a$ | δ |
|---|---|---|
| 0001 | 100 m | 0.98 |
| 0001 | 400 m | 0.95 |
| 0001 | 900 m | 0.88 |

FIG. 6C

ENHANCING GEO-LOCATION PRECISION IN WIRELESS SYSTEMS

BACKGROUND

Wireless networks, such as cellular networks, may provide network connectivity to user devices, such as cellular telephones. These wireless networks may determine geographical locations, or approximate geographical locations, of these user devices. For example, a wireless network may determine the geographical location of a user device based on the location of a base station to which the user device is connected.

BRIEF DESCRIPTION OF THE DRAWINGS

FIGS. 4, 5 and 6A-6C illustrate example data structures that may be stored by one or more devices, according to one or more implementations described herein;

DETAILED DESCRIPTION OF PREFERRED EMBODIMENTS

The following detailed description refers to the accompanying drawings. The same reference numbers in different drawings may identify the same or similar elements.

Existing systems often include functionality for determining (or approximately determining) a location of a user device. Such systems may include, for example, a cellular telephone system, which may determine a location of a user device using triangulation and/or one or more other techniques. Such triangulation techniques may involve determining the location of the user device based on signals sent and/or or received by multiple base stations, which may be located at different locations.

Some systems may determine the location of a user device based on signals sent and/or received by a single base station. For example, some such systems may determine the distance of a user device from a particular base station based on round trip delay ("RTD") and/or a radio signal strength indicator ("RSSI") of signaling messages transmitted between the user device and the base station. For example, these factors (e.g., RTD and/or RSSI) may be values that are measured by devices associated with a cellular network. In some situations, this determined distance may be inaccurate, due to one or more factors, such as multipath radio propagation, processing delay, antenna system phase delay, chip quantization error, and/or other factors.

Figure 1A:
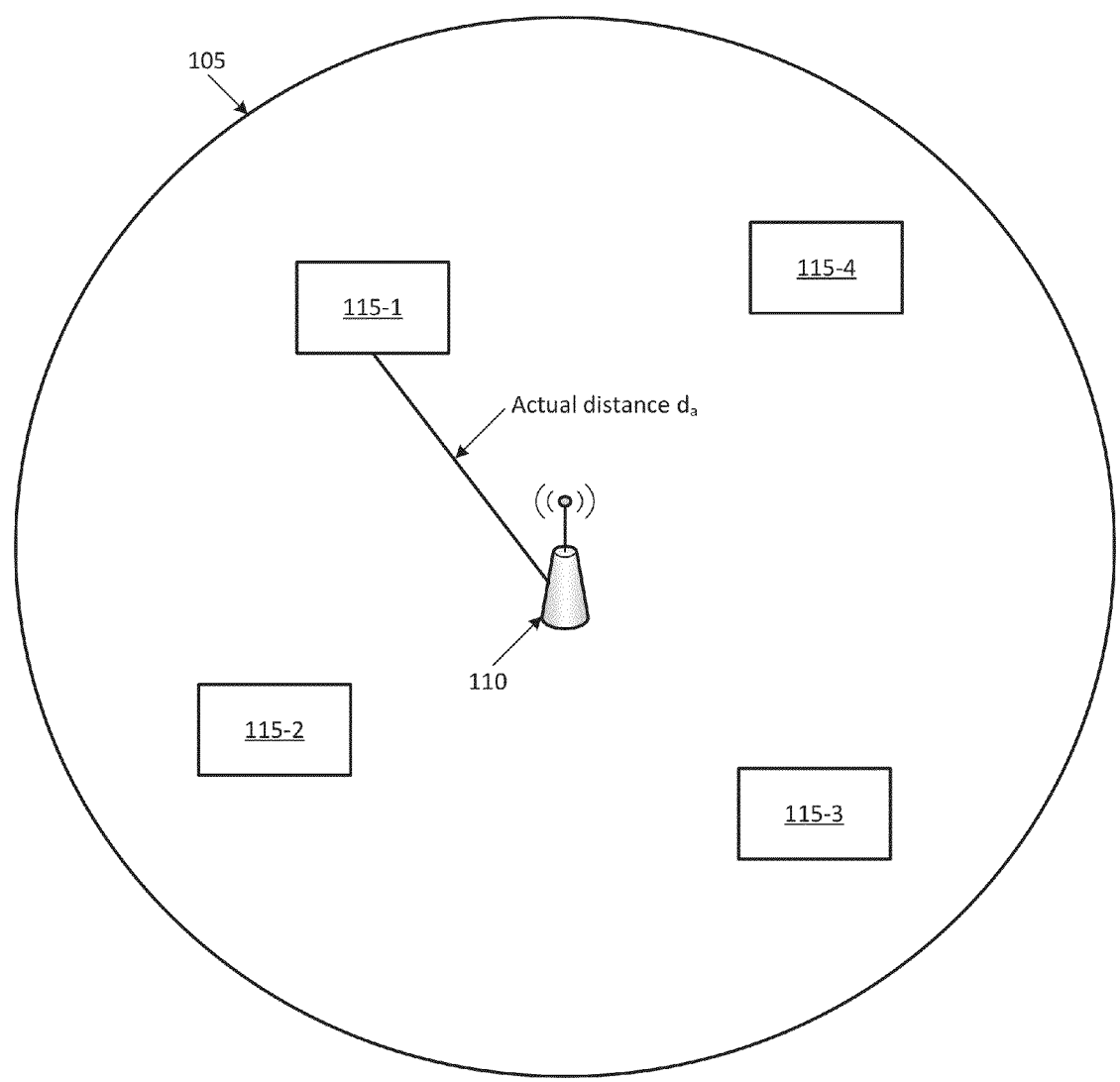
FIGS. 1A-1D illustrate an overview of one or more example implementations described herein.

A system and/or method, described herein, may be capable of more accurately determining a location of a user device, based on signals transmitted between the user device and a base station (e.g., between the user device and a single base station). FIGS. 1A-1D illustrate an overview of one or more example implementations described herein. As shown in FIG. 1A, coverage area 105 may conceptually represent a coverage area associated with base station 110, which may be a base station of a radio access network ("RAN") associated with a cellular telephone network. Several reference devices 115-1 through 115-4 (hereinafter referred to collectively as "reference devices 115," or individually as "reference device 115") may be present within coverage area 105, and may be in communication with base station 110 (e.g., may transmit signals to and/or receive signals from base station 110). Reference devices 115 may be referred to as "reference" devices, because their actual physical distance from base station 110 may be a known distance. For example, as shown in FIG. 1A, the actual distance between reference device 115-1 and base station 110 may be distance $d_a$.

Figure 1B:
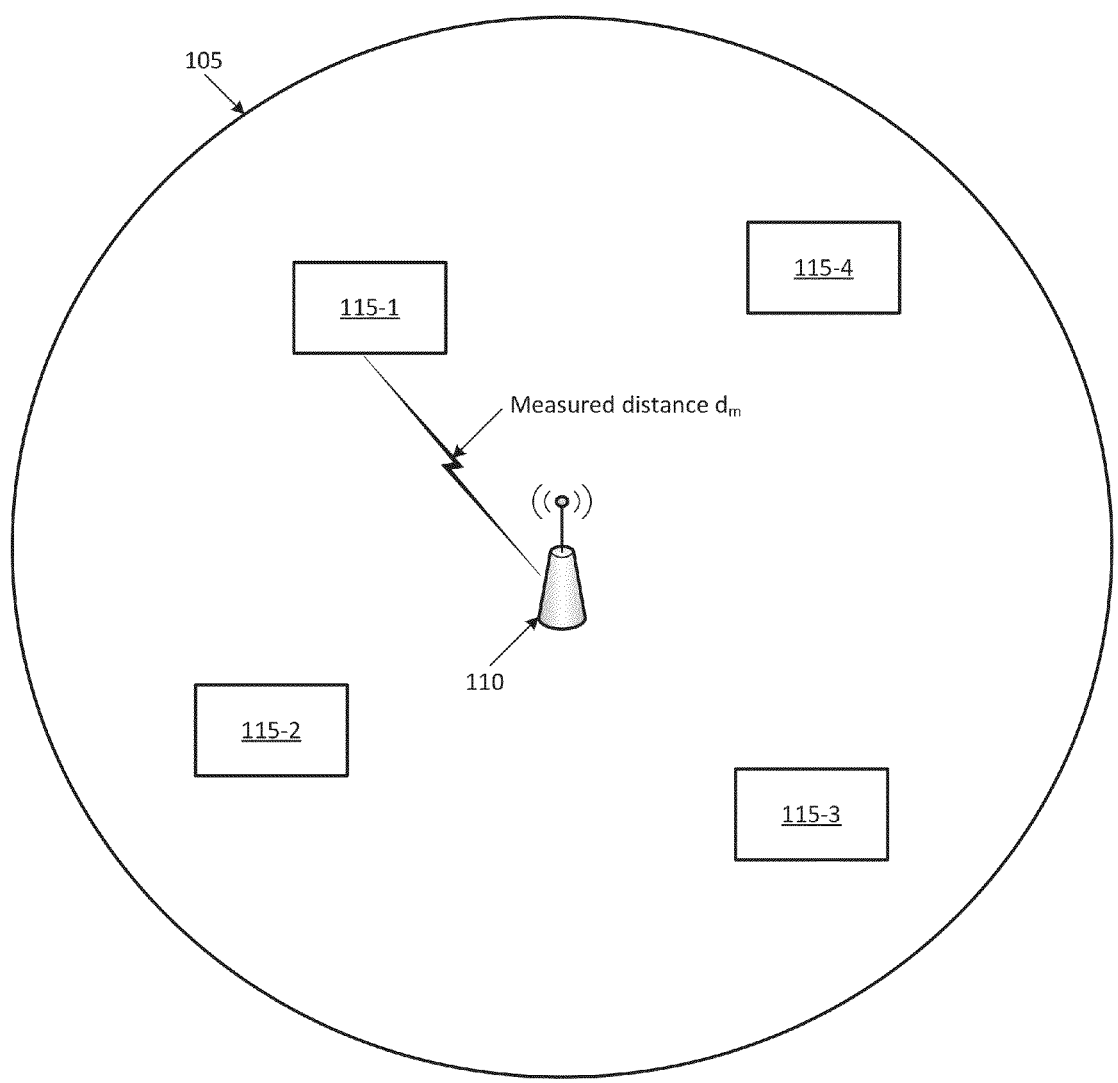

As mentioned above, reference devices 115 may be in communication with base station 110, such as wireless communication via one or more radio transceivers. In addition to the known distance $d_a$, for reference device 115-1, as shown in FIG. 1B, dynamically measured distance $d_m$ may be obtained between reference device 115-1 and base station 110 based on wireless communication between reference device 115-1 and base station 110. Measured distance $d_m$ may be measured based on, for example, an RTD time associated with communications between reference device 115-1 and base station 110. That is, in some implementations, measured distance $d_m$ may be measured based on the elapsed time between base station 110 sending a message to reference device 115-1 and base station 110 receiving a response to the message from reference device 115-1.

In some implementations, one or more devices may calculate an estimation coefficient $\delta$ based on $d_a$ and $d_m$ (e.g., $d_a/d_m$, $d_m/d_a$, or some other function of $d_a$ and $d_m$). The estimation coefficient $\delta$ may indicate an error between actual distances of reference devices and measured distances of reference devices. As described below, estimation coefficient $\delta$ may aid in estimating distances of other devices, for which actual distances are not known, from base station 110. That is, when attempting to determine a location of a device (e.g., a user device), estimation coefficient $\delta$ may be used to aid in compensating for errors which may occur when measuring the distance of the device from base station 110.

Figure 1C:
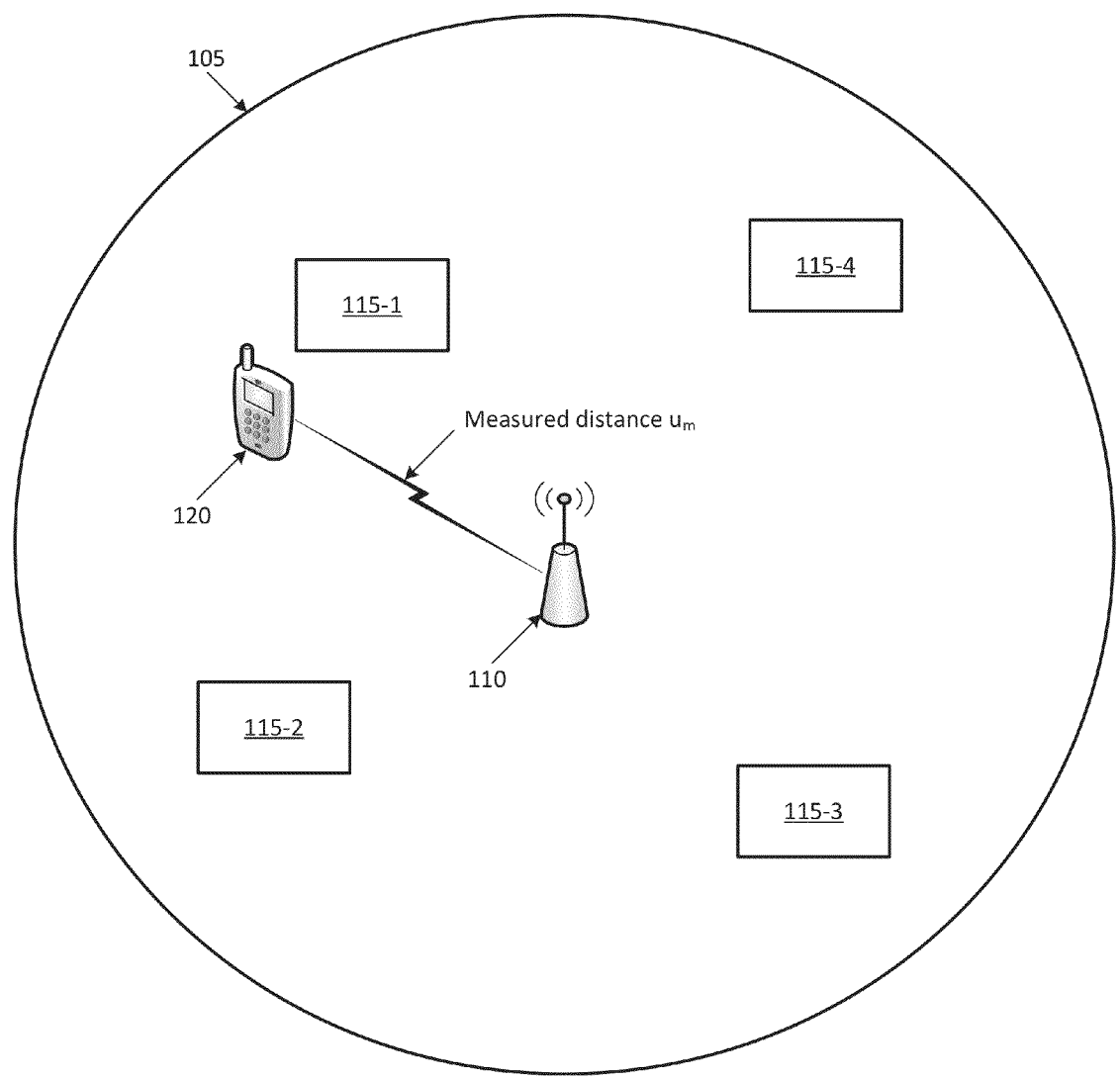
Figure 1D:
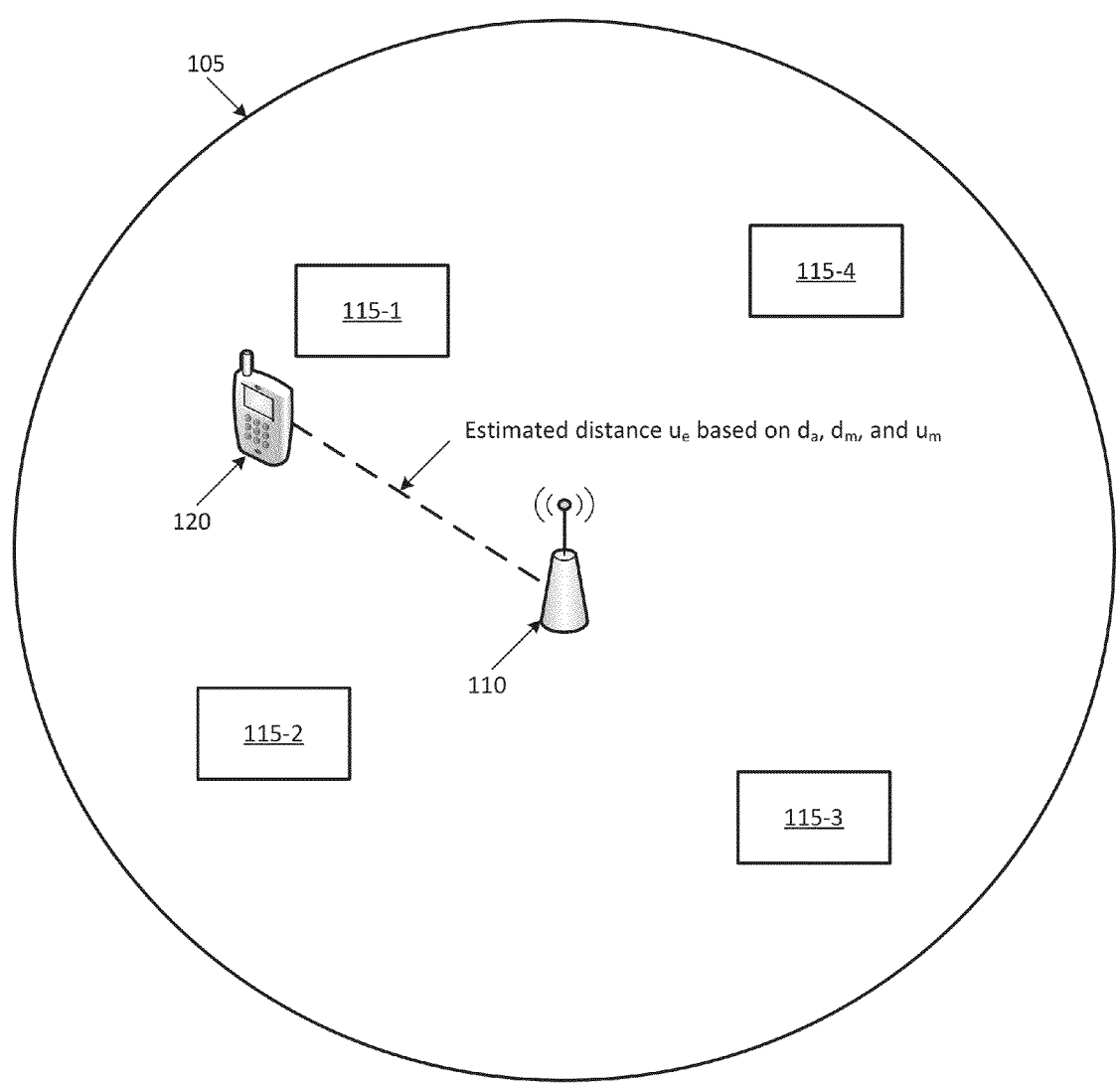

For example, as shown in FIG. 1C, user device 120 may be in communication with base station 110. Measured user device distance $u_m$ may be calculated based on communications between user device 120 and base station 110 (e.g., based on RTD time and/or using another technique). As shown in FIG. 1D, estimated user device distance $u_e$ may be calculated based on $d_a$, $d_m$, and $u_m$ (e.g., calculated based on $\delta$ and $u_m$). Determining the distance of user device 120 from base station 110 based on $\delta$ and $u_m$ may be more accurate than determining the distance of user device 120 from base station 110 based on $u_m$ alone, as $\delta$ may compensate for errors that may consistently occur, and skew the measured distance readings in a predictable manner.

Figure 2:
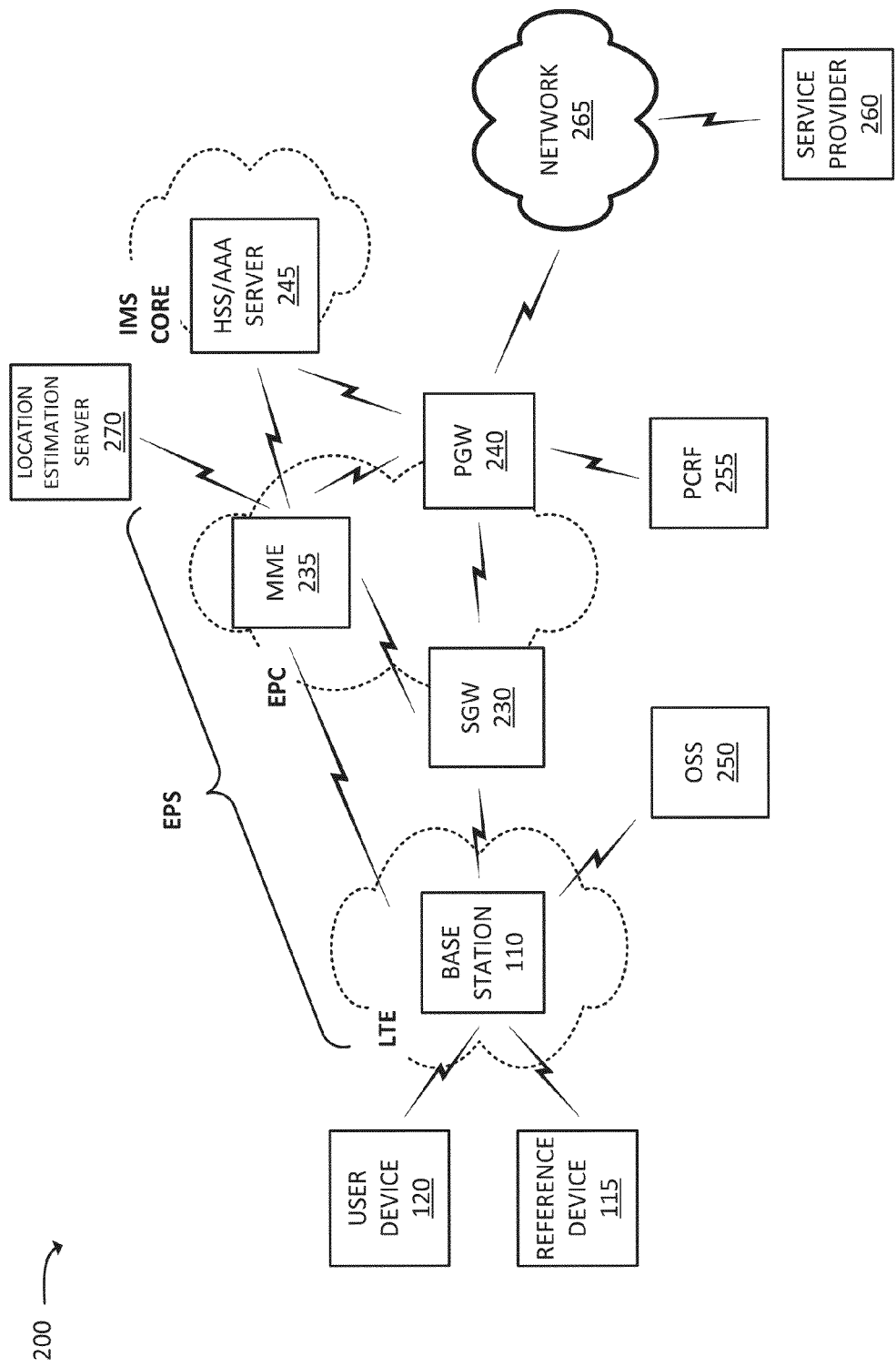
FIG. 2 illustrates an example network in which systems and/or methods, described herein, may be implemented.

FIG. 2 illustrates an example environment 200, in which systems and/or methods described herein may be implemented. As shown in FIG. 2, environment 200 may include base station 110, reference device 115, user device 120, serving gateway ("SGW") 230, mobility management entity device ("MME") 235, packet data network ("PDN") gateway ("PGW") 240, home subscriber server ("HSS")/authentication, authorization, accounting ("AAA") server 245 (hereinafter referred to as "HSS/AAA server 245"), operations support system ("OSS") 250, policy charging and rules function ("PCRF") 255, service provider 260, and network 265.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a RAN that includes one or more base stations 110, some or all of which, take the form of an eNodeB ("eNB"), via which user device 120 may communicate with the EPC network. The EPC network may include one or more SGWs 230, MMEs 235, and/or PGWs 240, and may enable user device 120 to communicate with network 265 and/or an Internet protocol ("IP") multimedia subsystem ("IMS") core network. The IMS core network may include HSS/AAA server 245, and may manage authentication, session initiation, account information, a user profile, etc. associated with user device 120.

Reference device 115 may include any computation and communication device, such as a wireless mobile communication device that is capable of communicating with base station 110 and/or network 265. In some implementations, reference device 115 may be a fixed device (e.g., a device that typically remains in a particular physical location). As mentioned above, reference device 115 may be a device for which the geographical location is a known location. In some implementations, reference device 115 may include a vending machine, a smart grid meter, a point of sale device, or some other device. In some implementations, reference device 115 may include a mobile device, for which a geographic location may be able to be determined. For example, reference device 115 may include a mobile device (e.g., a device that does not typically remain in a particular physical location), which includes a capability to determine its own location using global positioning system ("GPS") techniques. Reference device 115 may send traffic to and/or receive traffic to base station 110, and/or to one or more other devices.

User device 120 may include any computation and communication device, such as a wireless mobile communication device that is capable of communicating with base station 110 and/or network 265. For example, user device 120 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 120 may send traffic to and/or receive traffic from network 265 via signal bearers, such as base station 110, SGW 230, and/or PGW 240.

Base station 110 may include one or more network devices that receive, process, and/or transmit traffic, such as calls, audio, video, text, and/or other data, destined for and/or received from user device 120. In one example, base station 110 may be an eNB device and may be part of the LTE network. Additionally, or alternatively, one or more other base stations 110 may be associated with a RAN that is not associated with the LTE network (e.g., a wireless hot spot, a wireless access point, etc.). Base station 110 may receive traffic from and/or send traffic to network 265 via SGW 230 and PGW 240. Base station 110 may send traffic to and/or receive traffic from user device 120 via an air interface.

SGW 230 may include one or more network devices that gather, process, search, store, and/or provide information in a manner described herein. For example, SGW 230 may include a gateway, a router, a modem, a switch, a firewall, a network interface card ("NIC"), a hub, a bridge, a proxy server, an optical add-drop multiplexer ("OADM"), or some other type of device that processes and/or transfers traffic. SGW 230 may, for example, aggregate traffic received from one or more base stations 110 and may send the aggregated traffic to network 265 via PGW 240.

MME 235 may include one or more computation and communication devices that gather, process, search, store, and/or provide information in a manner described herein. For example, MME 235 may perform operations to register user device 120 with the EPS, to establish bearer channels associated with a session with user device 120, to handoff user device 120 from the EPS to another network, to handoff user device 120 from the other network to the EPS, and/or to perform other operations. MME 235 may perform policing operations on traffic destined for and/or received from user device 120.

PGW 240 may include one or more network devices, or other types of computation and communication devices, that gather, process, search, store, and/or provide information in a manner described herein. For example, PGW 240 may include a gateway, a router, a modem, a switch, a firewall, a NIC, a hub, a bridge, a proxy server, an OADM, or some other type of device that processes and/or transfers traffic. PGW 240 may aggregate traffic received from one or more SGWs 230, etc. and may send the aggregated traffic to network 265. PGW 240 may also, or alternatively, receive traffic from network 265 and may send the traffic toward user device 120 via SGW 230 and/or base station 110.

HSS/AAA server 245 may include one or more server devices, or other types of devices, that gather, process, search, store, and/or provide information. For example, HSS/AAA server 245 may manage, update, and/or store, in a memory associated with HSS/AAA server 245, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 120 and/or one or more other user devices 120. Additionally, or alternatively, HSS/AAA server 245 may perform authentication, authorization, and/or accounting operations associated with the subscriber and/or a communication session with user device 120.

OSS 250 may include one or more server devices, or other types of devices, that support processes such as maintaining network inventory, provisioning services, configuring network components, and managing faults.

PCRF 255 may include one or more server devices, or other types of devices, that aggregate information to and from the EPC network, OSS 250, and/or other sources. PCRF 255 may receive information regarding policies and/or subscriptions from one or more sources, such as subscriber databases and/ or from one or more users (such as, for example, an administrator associated with PCRF 255).

Service provider 260 may include one or more server devices, or other types of computation and communication devices, that provide content. For example, service provider 260 may host a website that can be accessed, by user device 120, to receive a service. The service may, for example, correspond to content (e.g., applications, web pages, video, audio, images, games, advertising content, text, data, and/or some combination thereof), a messaging service (e.g., email, instant message, etc.), a banking service, an electronic sales transaction service, etc. Service provider 260 may provide the content and/or service to user device 120 when application server 265 indicates that a subscriber, of user device 120, is authenticated.

Network 265 may include one or more wired and/or wireless networks. For example, network 265 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 265 may include a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Location estimation server 270 may include one or more devices that estimate distances of devices, such as user devices 120, from base station 110. As described below, location estimation server 270 may store information regarding reference devices 115 (e.g., information regarding actual and/ or measured distances of reference devices 115 from base station 110), information regarding estimation coefficients associated with base station 110, and/or other information. In some implementations, and as additionally described below, location estimation server 270 may generate or modify estimation coefficients based on actual and/or measured distances of reference devices 115 from base station 110. Furthermore, in some implementations, location estimation server 270 may estimate distances of user devices 120 from base station 110 based on, for example, estimation coefficients associated with base station 110.

Figure 3:
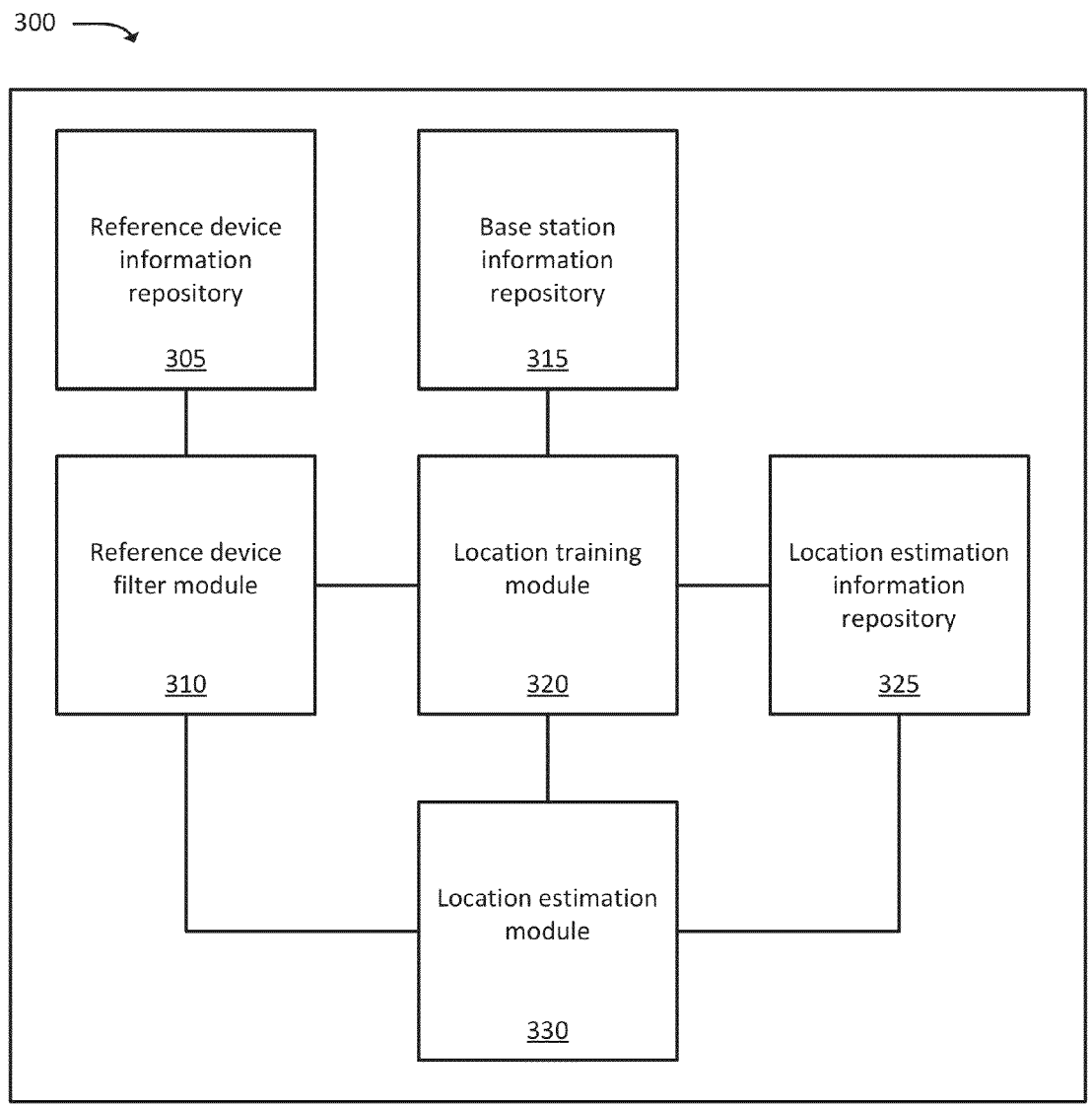
FIG. 3 illustrates example functional components of a location estimation server, according to one or more implementations described herein.

FIG. 3 is a diagram of example functional components of system 300. In some implementations, system 300 may correspond to, for example, location estimation server 270. In some implementations, system 300 may correspond to one or more other devices in addition to, or in lieu of, dead zone location server 115. As shown in FIG. 3, system 300 may include reference device information repository 305, reference device filter module 310, base station information repository 315, location training module 320, location estimation information repository 325, and location estimation module 330. Any, or all, of modules 305-325 may be implemented by one or more memory devices and/or one or more processors. Furthermore, multiple modules may be associated with the same memory device and/or processor (e.g., one memory device, or one set of memory devices, may store information associated with at least two different ones of modules 305-325).

Reference device information repository 305 may store information regarding reference devices (e.g., regarding one or more reference devices 115). As mentioned above, reference devices may be devices with a known location. The information stored by reference device information repository 305 may be used by one or more other devices, as described below, when generating or modifying location estimation information associated with one or more base stations.

FIG. 4 illustrates an example data structure 400, which may be stored by reference device information repository 305. As shown in FIG. 4, data structure 400 may store information regarding reference devices, such as a device identifier ("Device ID") and a location of the reference device ("Location"). The device identifier, stored by data structure 400, may be any type of device identifier. For example, in some implementations, the device identifier for a particular reference device may include an international mobile subscriber identity ("IMSI"), an electronic serial number ("ESN"), a mobile equipment identifier ("MEID"), a mobile device number ("MDN"), and/or another device identifier of the particular reference device. In some implementations, the location information, stored by data structure 400, may be coordinates expressed in longitude and latitude. In other implementations, the location information may be represented in some other way.

Returning to FIG. 3, reference device filter module 310 may receive information regarding communications from a device (e.g., from reference device 115 and/or user device 120), and determine whether the device is a reference device. As described below, if reference device filter module 310 determines that the device is a reference device, one or more devices and/or modules may generate or modify location estimation information based on the communication. If, on the other hand, and also as described below, reference device filter module 310 determines that the device is not a reference device, one or more devices may use location estimation information to compute a location of the device.

In some implementations, a particular communication, received from a device, may include a device identifier that may be used to identify the device (e.g., an IMSI, an ESN, an MEID, an MDN, and/or another device identifier). Reference device filter module 310 may, in some such implementations, compare the device identifier to information stored by reference device information repository 305. Based on this comparison, reference device filter module 310 may determine whether the device, from which the communication was received, is a reference device. For example, if the device identifier associated with the communication matches device identifier information stored by reference device information repository 305, reference device filter module 310 may determine that the device is a reference device. If, on the other hand, the device identifier associated with the communication does not match device identifier information stored by reference device information repository 305, reference device filter module 310 may determine that the device is not a reference device (e.g., that the device is a user device).

Base station information repository 315 may store information regarding base stations (e.g., regarding one or more base stations 110). The information stored by base station information repository 315 may be used when generating or modifying location estimation information associated with the base stations.

FIG. 5 illustrates an example data structure 500, which may be stored by base station information repository 315. A base station may be associated with one or more sectors (e.g., a particular coverage area that is associated with a particular radio transceiver associated with the base station). As shown in FIG. 5, data structure 500 may store information regarding one or more sectors associated with one or more base stations. As shown in FIG. 5, data structure 500 may store a sector identifier of a sector ("Sector ID"), information regarding a radio access technology ("RAT") associated with the sector, a band frequency associated with the sector, a carrier frequency associated with the sector, a location of the sector (e.g., a location of a radio transceiver associated with the sector, a location of a center point of the sector, or some other location associated with the sector), an antenna azimuth associated with the sector (e.g., as expressed as an angle relative to true north and/or some other reference point), and an antenna horizontal beamwidth ("Antenna Beamwidth") associated with the sector.

Returning to FIG. 3, location training module 320 may generate or modify location estimation information based on communications received from reference devices and/or information stored by reference device filter module 310 and/or base station information repository 315. As described below, location estimation information may be used when computing distances of user devices, for which an actual location is not known (or not precisely known), from base stations.

Assume, for example, that, based on an RTD associated with a communication received from a reference device, the measured distance $d_m$ between the reference device and a particular base station is calculated to be 95 meters. Further assume that, based on information stored in reference device filter module 310 and base station information repository 315, location training module 320 determines that the actual distance $d_a$ between the reference device and the base station is 100 meters. In this situation, location training module 320 may calculate an estimation coefficient δ based on $d_a$ and $d_m$, such as 0.95 ($d_m/d_a$=95/100), or some other calculation based on $d_a$ and $d_m$. Thus, in this situation, location training module 320 may determine that an estimation coefficient δ associated with the base station (or a particular sector associated with the base station and the communication) is 0.95.

Location training module 320 may provide this information to a repository that stores location estimation information, such as location estimation information repository 325 and/or some other device. Location estimation information may include estimation coefficients δ, as well as information identifying base stations and/or sectors associated with the estimation coefficients δ. In some implementations, as described below, location estimation information may also associate one or more additional factors associated with estimation coefficients δ (e.g., conditions that must be met for estimation coefficients δ to apply).

In some situations, location estimation information repository 325 may already store information regarding the particular base station and/or sector. In some such situations, location training module 320 may modify the information regarding the particular base station and/or sector based on the information determined above. For example, assume that location estimation information repository 325 stores information regarding a particular sector, indicating that, based on 3 communications, the estimation coefficient δ for the sector is 0.98. Based on the information calculated above, location training module 320 may average the estimation coefficients δ to obtain a new estimation coefficient δ for the sector. For instance, location training module 320 may determine that the new estimation coefficient δ for the sector is 0.9725 ((0.98*3+ 0.95)/4=0.9725). In some implementations, location training module 320 may modify the estimation coefficient δ in some other way.

In some implementations, location training module 320 may determine trends associated with communications in order to determine whether a particular base station, or sector of a base station, should be associated with multiple different estimation coefficients δ. For instance, such a situation may occur when different (e.g., significantly different, such as a difference of 5%, 10%, 25%, or some other proportion) estimation coefficients δ are observed under different circumstances.

For example, location training module 320 may identify that a particular sector is associated with an estimation coefficient δ of 0.95 on a particular day or days of the week (e.g., Mondays), and that the particular sector is associated with an estimation coefficient δ of 1.10 on different days of the week. As another example, location training module 320 may identify that a particular sector is associated with one estimation coefficient δ between a particular time of day (e.g., 3:00-5:00 PM), and that the particular sector is associated with a different estimation coefficient δ at different times. As yet another example, location training module 320 may identify that a particular sector is associated with one estimation coefficient δ when a measured distance $d_m$ of a reference device is a particular distance or range of distances (e.g., 500 meters or less), and that the particular sector is associated with a different estimation coefficient δ when the measured distance $d_m$ of the reference device is a different distance or range of distances (e.g., greater than 500 meters). As a further example, location training module 320 may identify that a particular sector is associated with one estimation coefficient δ when an actual distance $d_a$ of a reference device is a particular distance or range of distances (e.g., 500 meters or less), and that the particular sector is associated with a different estimation coefficient δ when the actual distance $d_a$ of the reference device is a different distance or range of distances (e.g., greater than 500 meters).

While some examples of factors which could affect whether a particular base station or sector is associated with multiple estimation coefficients δ are described above, other factors may be used. For example, base stations or sectors may be associated with multiple estimation coefficients δ based on a bearing of a reference device from an antenna azimuth associated with a sector, a location of the reference device (e.g., a location on a radial map grid, a location on a Cartesian map grid, longitude and latitude, etc.), and/or other factors. Furthermore, in some implementations, multiple factors may be combined when associating base stations or sectors with multiple estimation coefficients δ. For example, a particular sector may be associated with one estimation coefficient δ that may be used on Mondays between 3:00-5:00 PM, for reference devices that are within 500 meters from the base station.

As mentioned above, location estimation information repository 325 may store location estimation information. FIGS. 6A-6C illustrate example data structures 600-610, which may be stored by location estimation information repository 325. In the example shown in FIG. 6A, data structure 600 may associate sector identifiers with estimation coefficients δ. In the example shown in FIG. 6B, data structure 605 may associate sector identifiers with time periods and estimation coefficients δ. The information stored in example data structure 605 may indicate that, on different days of the week, a particular sector may be associated with different estimation coefficients δ. In the example shown in FIG. 6C, data structure 610 may associate sector identifiers with actual distances $d_a$ and estimation coefficients δ. The information stored in example data structure 610 may indicate that, based on different actual distances $d_a$ of reference devices, a particular sector may be associated with different estimation coefficients δ. While FIG. 6C illustrates single values for actual distances $d_a$, in some implementations, data structure 610 may store values for ranges of actual distances $d_a$ (e.g., less than 100 meters, between 100 meters and 400 meters, between 400 meters and 900 meters, greater than 900 meters, etc.).

Returning to FIG. 3, location estimation module 330 may compute locations of user devices (e.g., distances from base stations), based on communications received from user devices and location estimation information (e.g., information stored by location estimation information repository 325). For example, assume that, based on an RTD associated with the communication, the measured distance $u_m$ between the user device and a particular base station is 100 meters. Further assume that an estimation coefficient δ associated with the base station is 0.95. For purposes of this example, assume that the estimation coefficient δ was calculated using $d_a/d_m$. In this example, location estimation module 330 may compute an estimated user device distance $u_e$ of 95 meters, using the equation $u_e/u_m = d_a/d_m$, (which may also be expressed as $u_e/u_m = δ$). In other implementations, location estimation module 330 may compute the estimated user device distance $u_e$, based on the estimation coefficient δ, using one or more other techniques and/or computations. Location estimation module 330 may output information indicating the estimated user device distance $u_e$ to one or more devices, such as an application server and/or another device.

Figure 7:
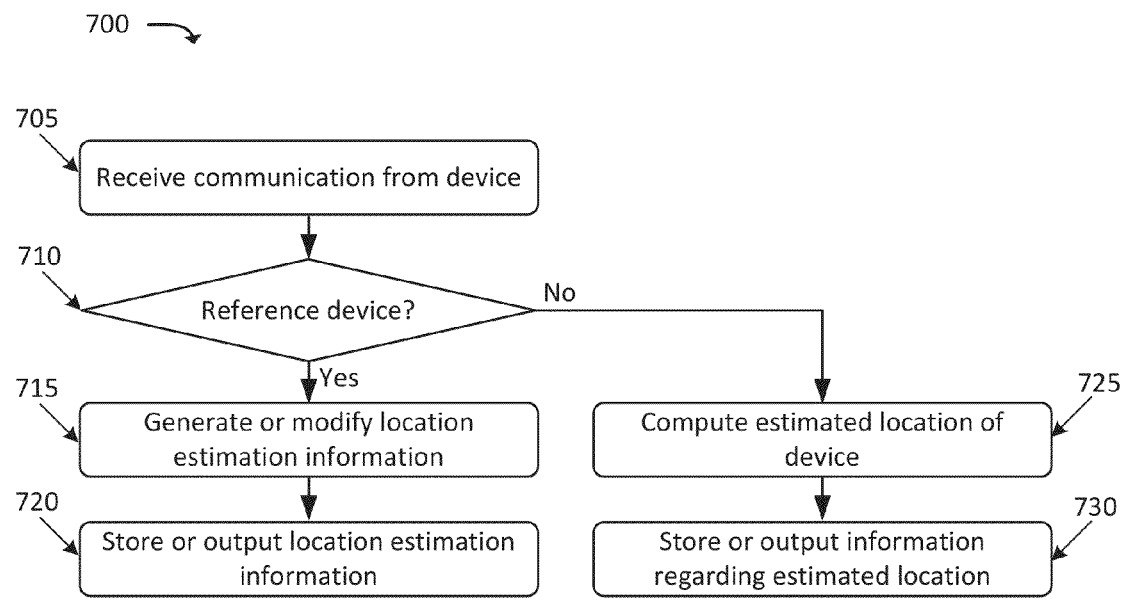
FIG. 7 illustrates an example process for estimating a distance of a device from a base station and/or for generating or modifying estimation information, according to one or more implementations described herein.

FIG. 7 illustrates an example process 700 for estimating a distance of a device from a base station and/or for generating or modifying estimation information. In one example implementation, process 700 may be performed by location estimation server 270 (e.g., by one or more of modules 305-330 described above with respect to FIG. 3). In another example implementation, some or all of process 700 may be performed by a device or collection of devices separate from, or in combination with, location estimation server 270.

Process 700 may include receiving a communication from a device (block 705). For example, location estimation server 270 may receive information from MME 235 (and/or another device) indicating that a communication has been received from a device, via, e.g., base station 110. This communication may include any type of communication, such as a communication associated with a voice call, a data transfer, a periodic "keep-alive" message, and/or another type of communication.

Process 700 may also include determining whether the device, from which the communication was received (at block 705) is a reference device (block 710). For example, as described above with respect to reference device filter module 310, location estimation server 270 may use information (such as device identifier information included in the communication) to determine whether the device is a reference device.

If the device is a reference device (block 710—YES), then process 700 may include generating or modifying location estimation information (block 715). A detailed example of processing associated with block 715, according to some implementations, is described below with respect to FIG. 8. Process 700 may also include storing or outputting the location estimation information (block 720). For example, location estimation server 270 may store the location estimation information in a repository, such as location estimation information repository 325, and/or output the location estimation information to one or more other devices.

If, on the other hand, the device is not a reference device (block 710—NO), then process 700 may include computing an estimated location of the device (block 725). A detailed example of processing associated with block 725, according to some implementations, is described below with respect to FIG. 9. Process 700 may also include storing or outputting information regarding the computed estimated location (block 730). For example, location estimation server 270 may output the location estimation information to one or more other devices.

Figure 8:
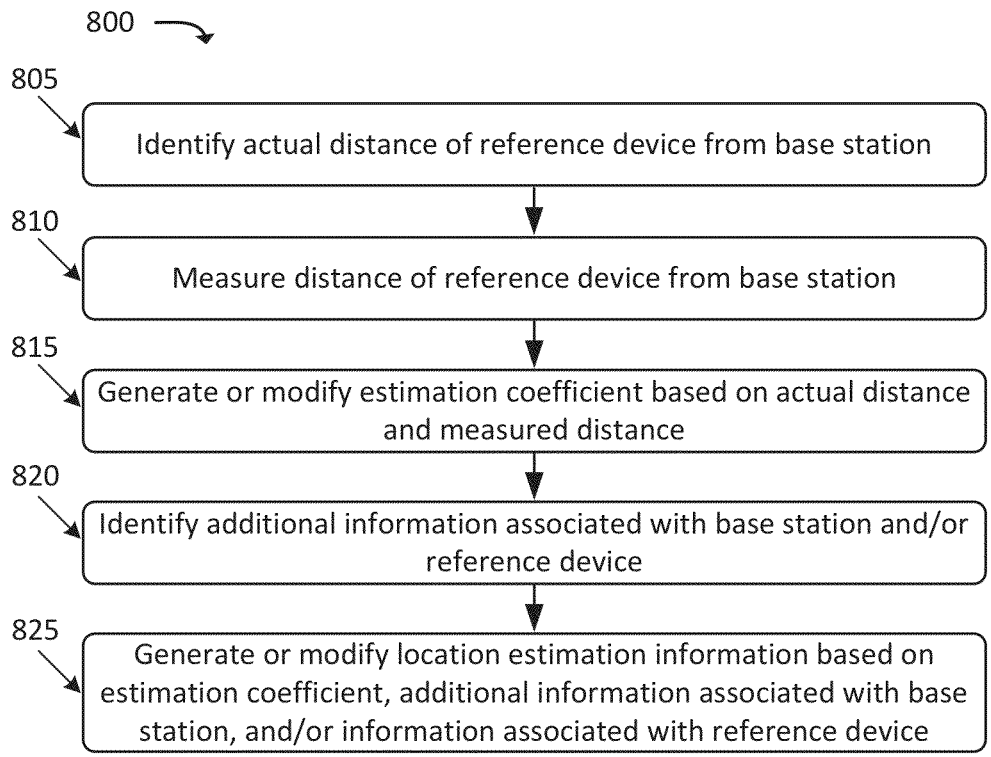
FIG. 8 illustrates an example process for generating or modifying estimation information, according to one or more implementations described herein.

FIG. 8 illustrates an example process 800 for generating or modifying estimation information. In one example implementation, process 800 may be performed by location estimation server 270 (e.g., by module 320 described above with respect to FIG. 3, and/or by one or more other modules described above with respect to FIG. 3). In another example implementation, some or all of process 800 may be performed by a device or collection of devices separate from, or in combination with, location estimation server 270. As mentioned above, process 800 may, in some implementations, correspond to block 715 of process 700.

Process 800 may include identifying an actual distance of a reference device from a base station (block 805). For example, as described above with respect to reference device information repository 305, base station information repository 315, data structure 400, and data structure 500, location estimation server 270 may store information regarding locations of base stations and reference devices. Based on this information, location estimation server 270 may identify a location of a base station, via which a communication was received from a reference device, and may also identify a location of the reference device, from which the communication was received. Based on these locations, location estimation server 270 may identify an actual distance $d_a$ of the reference device from the base station.

Process 800 may also include measuring a distance of the reference device from the base station (block 810). As mentioned above, the measured distance $d_m$ may be based on a RTD time, and/or based on some other technique of wirelessly measuring a distance of a device from a base station. In some implementations, location estimation server 270 may receive information regarding the measured distance $d_m$ from one or more devices, such as from MME 235.

Process 800 may additionally include generating or modifying an estimation coefficient based on the actual distance and the measured distance (block 815). For example, location estimation server 270 may calculate an estimation coefficient δ based on the actual distance $d_a$ and the measured distance $d_m$. In some implementations, the estimation coefficient δ may be a simple ratio of $d_a$ and $d_m$ (e.g., $d_a/d_m$ or $d_m/d_a$). In some implementations, location estimation server 270 may calculate the estimation coefficient δ based on $d_a$ and $d_m$ using some other technique. As mentioned above, location estimation server 270 may, in some implementations, average the calculated estimation coefficient δ with other estimation coefficients δ associated with a particular base station or sector of a base station to obtain an average estimation coefficient δ for the base station or sector.

Process 800 may further include identifying additional information associated with the base station and/or the reference device (block 820). For example, as discussed above, location estimation server 270 may identify potential trends, which may be associated with varying estimation coefficients δ for a particular base station or sector. These trends may include days of the week, times of day, measured distances $d_m$ of reference devices, actual distances $d_a$ of reference devices, bearing of reference devices from antenna azimuths of sectors, locations of reference devices, and/or other factors.

Process 800 may also include generating or modifying location estimation information based on the estimation coefficient, the additional information associated with base station, and/or the information associated with reference device (block 825). For example, location estimation server 270 may generate or modify location estimation information, as shown in example data structures 600-610 of FIGS. 6A-6C. In some implementations, location estimation server 270 may generate or modify location estimation information based only on recent information (e.g., based on estimation coefficients calculated within the last week, month, season, or some other measure of time).

Figure 9:
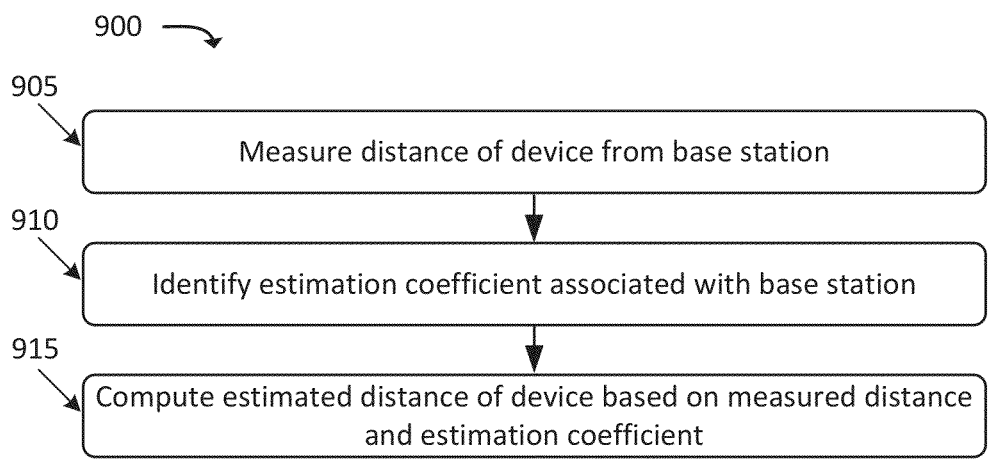
FIG. 9 illustrates an example process for estimating a distance of a device from a base station based on estimation information, according to one or more implementations described herein.

FIG. 9 illustrates an example process 900 for estimating a distance of a device from a base station based on estimation information. In one example implementation, process 900 may be performed by location estimation server 270 (e.g., by module 330 described above with respect to FIG. 3, and/or by one or more other modules described above with respect to FIG. 3). In another example implementation, some or all of process 900 may be performed by a device or collection of devices separate from, or in combination with, location estimation server 270. As mentioned above, process 900 may, in some implementations, correspond to block 725 of process 700.

Process 900 may include measuring a distance of a device from a base station (block 905). As mentioned above, the measured distance of the device $u_m$ may be based on a RTD time, and/or based on some other technique of wirelessly measuring a distance of a device from a base station. In some implementations, the technique of wirelessly measuring the distance of the device $u_m$ may be the same as the technique used to wirelessly measure the distance of a reference device $d_m$. In some implementations, location estimation server 270 may receive information regarding the measured distance $u_m$ from one or more devices, such as from MME 235.

Process 900 may also include identifying an estimation coefficient associated with the base station (block 910). For example, location estimation server 270 may identify an estimation coefficient δ, stored by data structure 600, associated with the base station. In some implementations, as discussed above, location estimation server 270 may identify an estimation coefficient δ, associated with the base station, based on one or more applicable factors (e.g., time of day, day of week, etc.).

Process 900 may further include computing an estimated distance of the device based on the measured distance and the estimation coefficient (block 915). For example, location estimation server 270 may calculate an estimated distance of the device $u_e$ by, for example, multiplying the measured distance $u_m$ by the estimation coefficient δ, dividing the measured distance $u_m$ by the estimation coefficient δ, and/or via one or more other computations.

Figure 10:
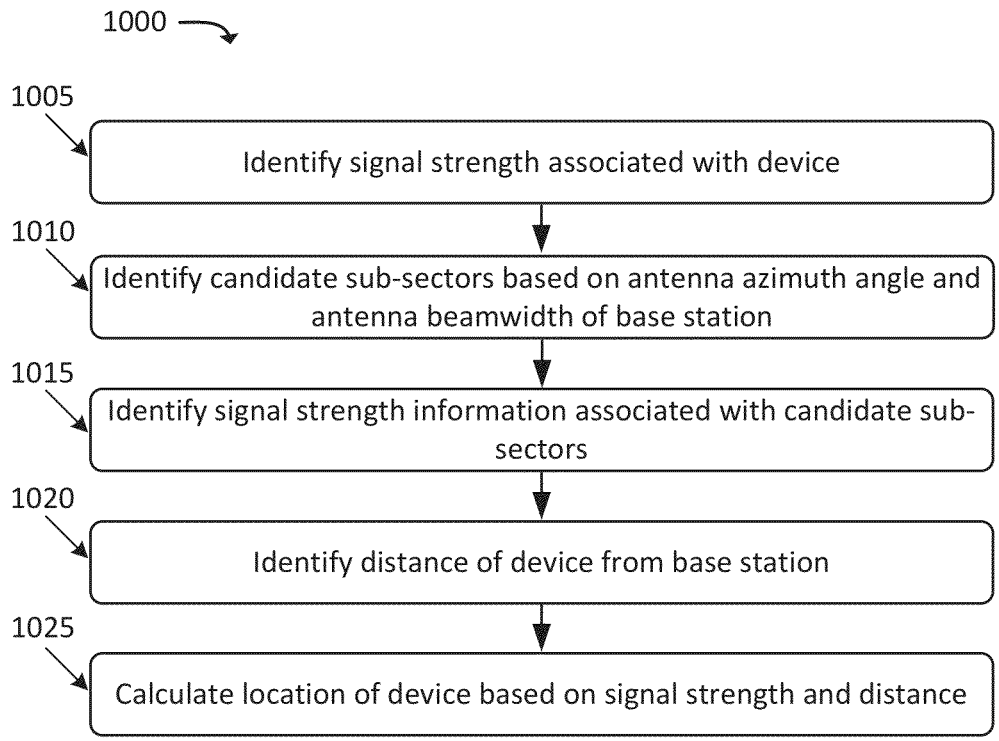
FIG. 10 illustrates an example process for calculating a location of a device based on signal strength and distance from a base station, according to one or more implementations described herein.

In some implementations, location estimation server 270 may further refine an estimate of a location of a user device, using the estimated distance $u_e$ with other information. FIG. 10 illustrates an example process 1000 performing such a refinement of an estimate of a location of a device, based on signal strength and distance from a base station. In one example implementation, process 1000 may be performed by location estimation server 270 (e.g., by one or more of modules 305-330 described above with respect to FIG. 3). In another example implementation, some or all of process 1000 may be performed by a device or collection of devices separate from, or in combination with, location estimation server 270. Process 1000 is described in conjunction with FIGS. 11A and 11B, which illustrate examples of concepts associated with process 1000.

Process 1000 may include identifying a signal strength associated with a device (block 1005). For example, location estimation server 270 may receive information regarding an RSSI associated with a communication between a user device and a base station. In some implementations, location estimation server 270 may receive the information regarding the RSSI from MME 235 and/or from some other device.

Figure 11A:
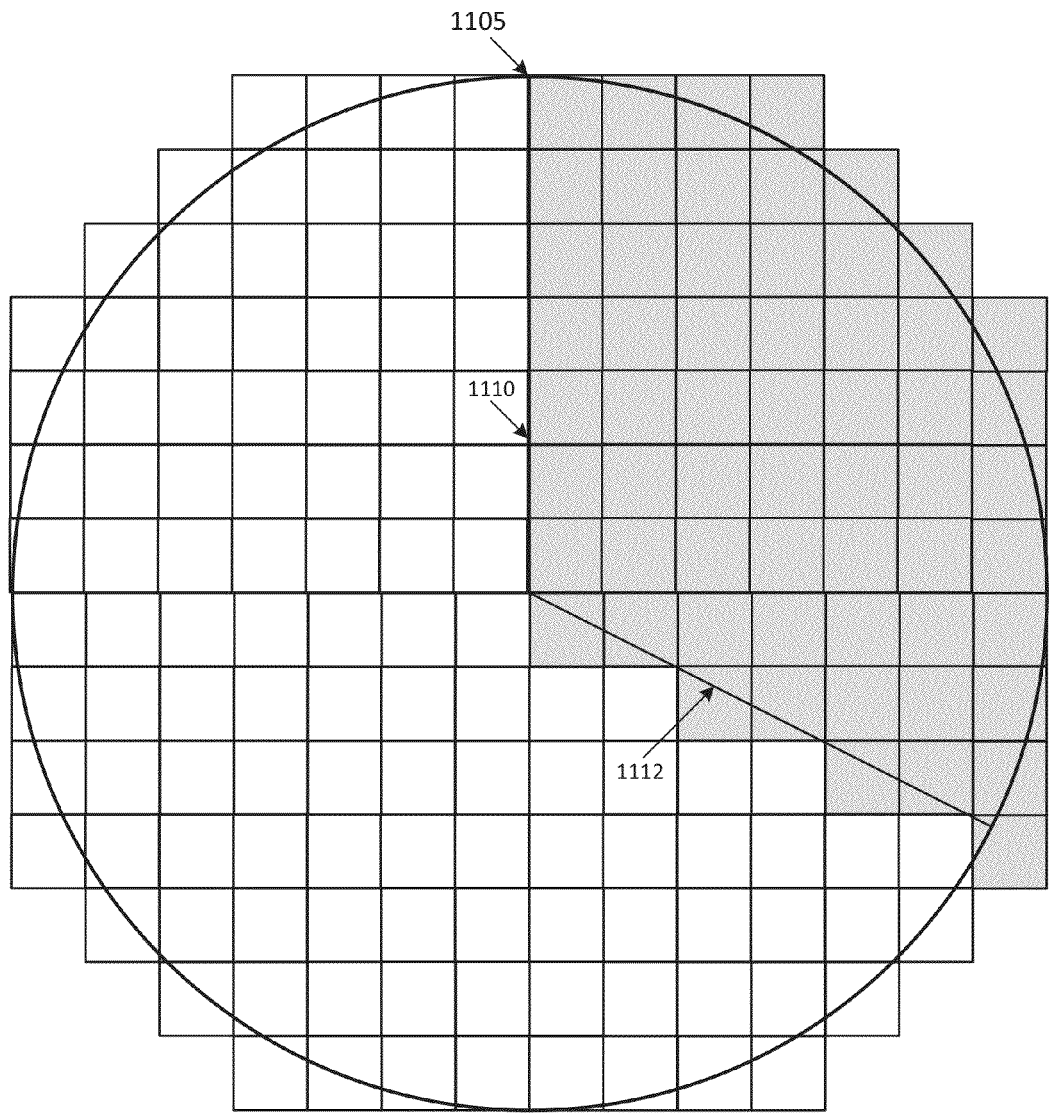
FIGS. 11A-11C illustrate a conceptual example of calculating a location of a device based on signal strength and distance from a base station, according to one or more implementations described herein.

Process 1000 may also include identifying a set of candidate sub-sectors based on an antenna azimuth angle and antenna beamwidth of the base station (block 1010). As shown in FIG. 11A, area 1105 may represent a geographic area around a base station. Area 1105 may include several sub-sectors, which are represented in FIG. 11A as 172 squares. Lines 1110 and 1112 may represent a portion of area 1105 that is within a coverage area of the base station, and may be determined based on the antenna azimuth angle and antenna beamwidth of a radio transceiver associated with the base station. The shaded squares, which are generally bounded by lines 1110 and 1112, may conceptually represent sub-sectors that are within the coverage area of the base station, and are, thus, candidate sub-sectors (e.g., sub-sectors in which a user device, which is in communication with the base station, may be present).

Process 1000 may further include identifying signal strength information associated with the candidate sub-sectors (block 1015). In some implementations, location estimation server 270 may store information identifying values of RSSIs associated with particular sub-sectors. These values may be obtained by measuring RSSIs of reference devices which are known to be in the particular sub-sectors, and/or via another technique (e.g., via manual input by one or more administrators).

Process 1000 may additionally include identifying a distance of the device from the base station (block 1020). In some implementations, location estimation server 270 may identify a distance of the device using a technique similar to the techniques described above with respect to FIG. 9. In some implementations, location estimation server 270 may identify the distance of the device using one or more other techniques.

Figure 11B:
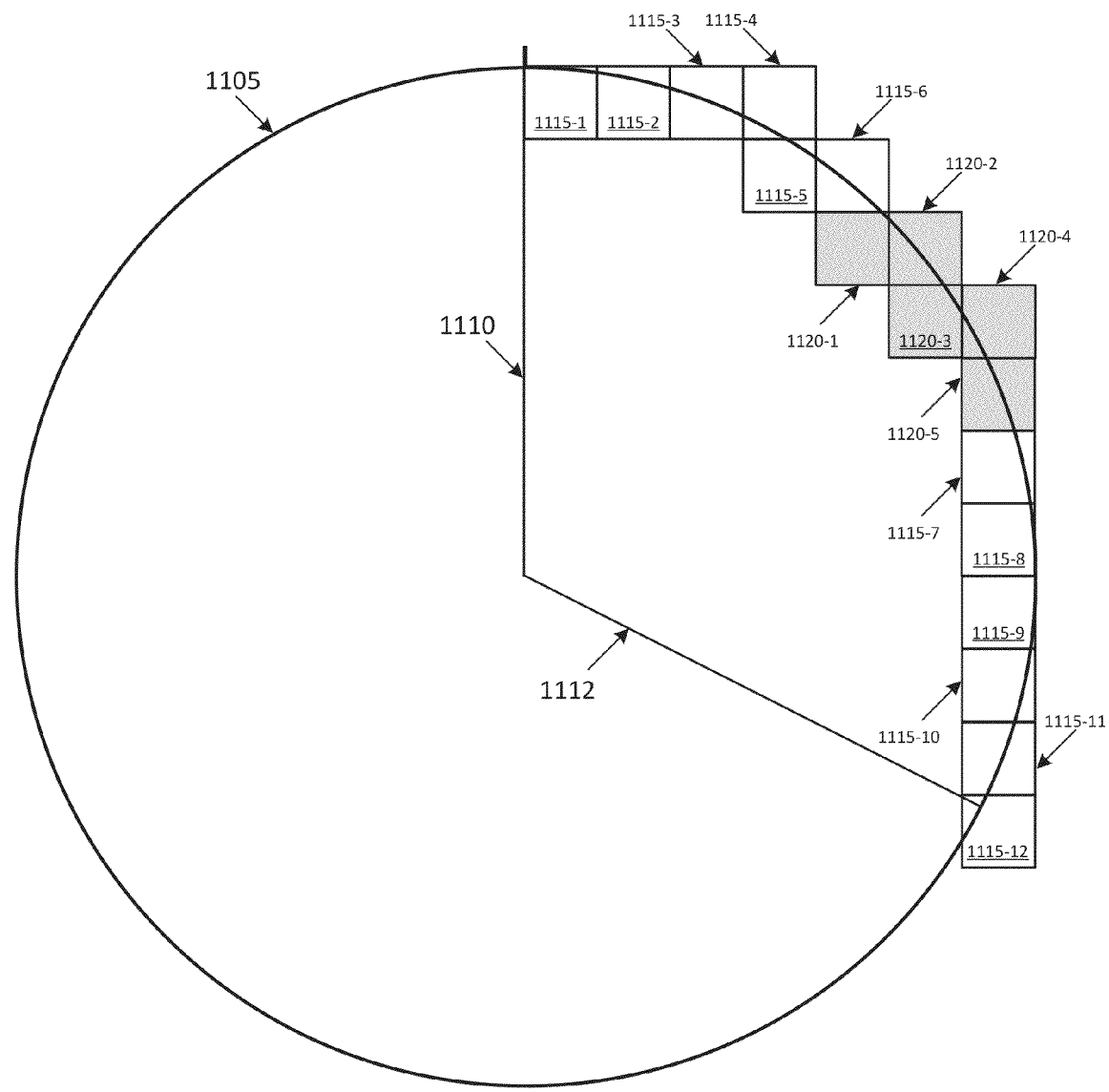

Process 1000 may also include calculating a location of the device based on the signal strength and the distance (block 1025). As shown in FIG. 11B, several of the candidate sub-sectors, identified at block 1010, may be associated with the distance identified at block 1020. For example, subsectors 1115-1 through 1115-12 and 1120-1 through 1120-5 may be at, or may include a point that is at, a distance that matches the distance identified at block 1020. Location estimation server 270 may identify, which (if any) of these sub-sectors are associated with an RSSI that matches (or approximately matches, e.g., is within 5%, 10%, 25%, or some other amount) the RSSI associated with the device (at block 1005). In the example shown in FIG. 11B, the shaded sub-sectors (i.e., sub-sectors 1120-1 through 1120-5) may be sub-sectors for which RSSI information matches the RSSI of the device. Thus, location estimation server 270 may determine that the device is located in one of sub-sectors 1120-1 through 1120-5. In some implementations, location estimation server 270 may store and/or output the information regarding the calculated location of the device.

Figure 11C:
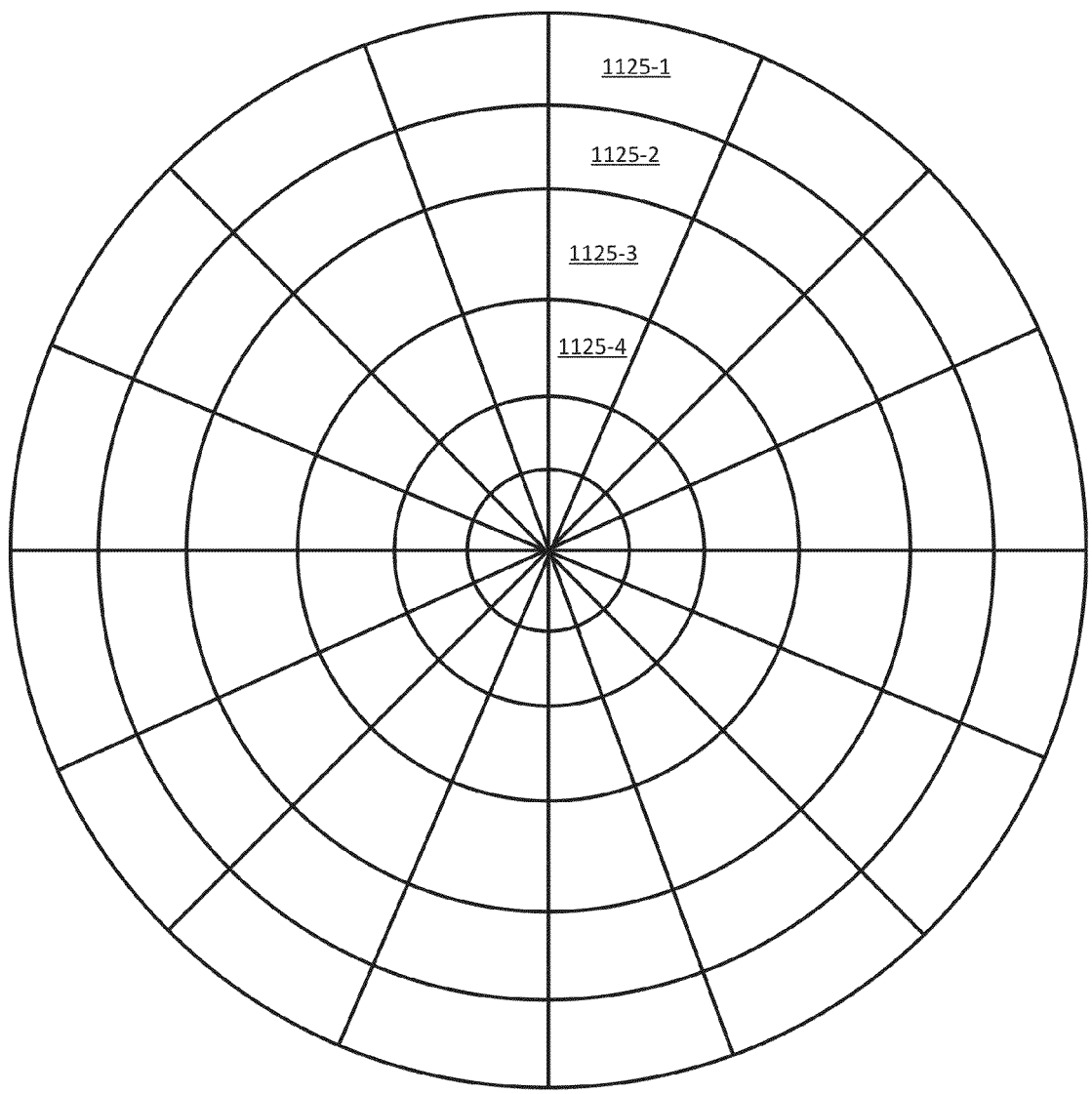

Although sub-sectors are illustrated in FIGS. 11A and 11B as squares, in some implementations, sub-sectors may be represented in other ways. For example, in some implementations, sub-sectors may be represented as rectangles and/or any other shape (either regular or irregular). In some implementations, sub-sectors may be represented as a radial grid, as shown in FIG. 11C. As shown in FIG. 11C, sub-sectors may include, for example, sub-sectors 1125-1 through 1125-4.

The device(s) and processes described above may be capable of determining a location of a user device, based on signals transmitted between the user device and a base station (e.g., between the user device and a single base station), in a manner that accounts for consistent and/or predictable errors. Furthermore, in some implementations, the techniques described above may be combined with other techniques, such as triangulation.

Figure 12:
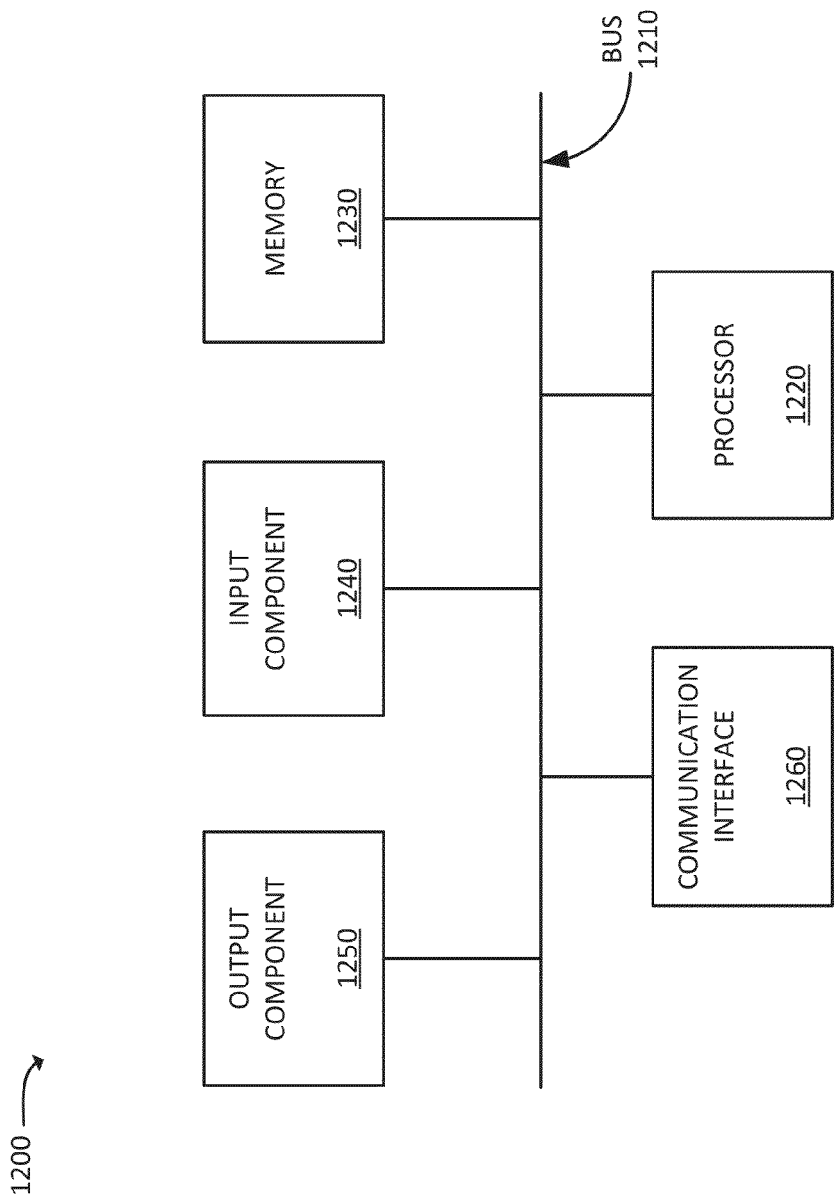
FIG. 12 illustrates example components of one or more devices shown in FIG. 2.

FIG. 12 is a diagram of example components of device 1200. Each of the devices illustrated in FIG. 1 or 2 may include one or more devices 1200. Device 1200 may include bus 1210, processor 1220, memory 1230, input component 1240, output component 1250, and communication interface 1260. In another implementation, device 1200 may include additional, fewer, different, or differently arranged components. Some non-limiting examples of device 1200, with additional and/or different components, are discussed below.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to computing an estimated location of a device and/or a distance of the device from a base station. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7-10, the order of the blocks may be modified in other implementations. Further, non-dependent blocks may be performed in parallel.

Furthermore, while examples of data structure have been described above with respect to FIGS. 4-6C, these data structures may store additional, different, differently arranged, or less information than the examples provided above. Additionally, while these example data structures are presented as tables, any other data structure may be used, such as a linked list, a tree, a hash table, an array, and/or any other type of data structure. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by one or more server devices, an indication that a communication has been received from a device by a base station;
   determining, by one or more processors of the one or more server devices, whether the device is a reference device with a known location;
   generating or modifying, by the one or more processors of the one or more server devices, an estimation coefficient, associated with the base station, based on determining that the device is a reference device with a known location, the generating or modifying being based on:
      an actual distance between the reference device and the base station, and
      a measured distance between the reference device and the base station;

computing, by the one or more processors of the one or more server devices, an estimated location of the device based on determining that the device is not a reference device with a known location, the computing including:
- identifying an estimation coefficient associated with the base station,
- identifying a measured distance between the device and the base station, and
- computing the estimated location of the device based on the estimation coefficient and the measured distance between the device and the base station; and storing or outputting, by the one or more server devices, the estimated location of the device.

2. The method of claim 1, wherein determining whether the device is a reference device includes:
- extracting device identifier information from the communication; and
- comparing the extracted device identifier information to information regarding device identifiers that are associated with reference devices.

3. The method of claim 1, wherein the measured distance between the reference device and the base station is based on a round trip delay time of one or more communications between the reference device and the base station.

4. The method of claim 1, wherein the measured distance between the reference device and the base station is different from an actual distance between the reference device and the base station.

5. The method of claim 1, wherein when the device is not a reference device, computing the estimated location of the device further comprises:
- identifying a radio signal strength associated with the communication;
- identifying one or more geographical areas that are associated with radio signal strengths that at least approximately match the radio signal strength associated with the communication, and that match a distance between the device and the base station; and
- determining that a location of the device includes at least one of the identified one or more geographical areas.

6. The method of claim 5, wherein identifying the one or more geographical areas that match the distance between the device and the base station includes:
- identifying the one or more geographical areas that match a distance that is based on:
  - the estimation coefficient, and
  - the measured distance between the base station and the device.

7. The method of claim 1, wherein the known location of the reference device is determined based on global positioning system functionality associated with the reference device.

8. A system, comprising:
one or more server devices to:
- receive an indication that a communication has been received from a device by a base station;
- determine whether the device is a reference device with a known location;
- generate or modify an estimation coefficient, associated with the base station, based on determining that the device is a reference device with a known location, the generating or modifying being based on:
  - the known location of the reference device,
  - a location of the base station, and
  - a measured distance between the reference device and the base station;
- compute an estimated location of the device based on determining that the device is not a reference device with a known location, the computing including:
  - identifying an estimation coefficient associated with the base station, the estimation coefficient being based on:
    - an actual distance between the base station and one or more reference devices associated with the base station, and
    - a measured distance between the base station and the one or more reference devices,
  - identifying a measured distance between the device and the base station, and
  - computing the estimated location of the device based on the estimation coefficient; and
- store or output the information regarding the estimation coefficient or the estimated location of the device.

9. The system of claim 8, wherein when determining whether the device is a reference device, the one or more server devices are to:
- extract device identifier information from the communication; and
- compare the extracted device identifier information to information regarding device identifiers that are associated with reference devices.

10. The system of claim 8, wherein the measured distance between the reference device and the base station is based on a round trip delay time of one or more communications between the reference device and the base station.

11. The system of claim 8, wherein the measured distance between the reference device and the base station is different from an actual distance between the reference device and the base station.

12. The system of claim 8, wherein the device is not a reference device, wherein when computing the estimated location of the device, the one or more server devices are further to:
- identify a radio signal strength associated with the communication;
- identify one or more geographical areas that are associated with radio signal strengths that at least approximately match the radio signal strength associated with the communication, and that match a distance between the device and the base station; and
- determine that a location of the device includes at least one of the identified one or more geographical areas.

13. The system of claim 12, wherein when identifying the one or more geographical areas that match the distance between the device and the base station, the one or more server devices are to:
- identify the one or more geographical areas that match a distance that is based on:
  - the estimation coefficient, and
  - the measured distance between the base station and the device.

14. The system of claim 8, wherein the known location of the reference device is determined based on global positioning system functionality associated with the reference device.

15. A non-transitory computer-readable medium, comprising:
a plurality of computer-executable instructions, which, when executed by one or more processors, cause the one or more processors to:
- compute an estimated location of a user device based on an estimation coefficient and a measured distance between the user device and a base station, the estimation coefficient being based on:

an actual distance between a reference device and the base station, and a measured distance between the reference device and the base station; and store or output the information regarding the estimated location of the device.

16. The non-transitory computer-readable medium of claim 15, wherein the measured distance between the reference device and the base station is based on a round trip delay time of one or more communications between the reference device and the base station.

17. The non-transitory computer-readable medium of claim 15, wherein the measured distance between the reference device and the base station is different from an actual distance between the reference device and the base station.

18. The non-transitory computer-readable medium of claim 15, wherein the computer-executable instructions, which cause the one or more processors to compute the estimated location of the user device, further cause the one or more processors to:

identify a radio signal strength associated with the communication;

identify one or more geographical areas that are associated with radio signal strengths that at least approximately match the radio signal strength associated with the communication, and that match a distance between the user device and the base station; and determine that a location of the user device includes at least one of the identified one or more geographical areas.

19. The non-transitory computer-readable medium of claim 18, wherein the computer-executable instructions, which cause the one or more processors to identify the one or more geographical areas that match the distance between the user device and the base station, further cause the one or more processors to:

identify the one or more geographical areas that match a distance that is based on:

the estimation coefficient, and the measured distance between the base station and the user device.

20. The non-transitory computer-readable medium of claim 15, wherein the known location of the reference device is determined based on global positioning system functionality associated with the reference device.

* * * * *